(12) United States Patent
Cooksey

(10) Patent No.: US 10,234,005 B2
(45) Date of Patent: Mar. 19, 2019

(54) DEVICE FOR CONTINUOUSLY VARIABLE TRANSMISSION

(71) Applicant: George E Cooksey, Ridgecrest, CA (US)

(72) Inventor: George E Cooksey, Ridgecrest, CA (US)

( * ) Notice: Subject to any disclaimer, the term of this patent is extended or adjusted under 35 U.S.C. 154(b) by 0 days.

(21) Appl. No.: 14/732,355

(22) Filed: Jun. 5, 2015

(65) Prior Publication Data
US 2016/0356369 A1     Dec. 8, 2016

(51) Int. Cl.
*F16H 15/42*     (2006.01)
*F16H 37/02*     (2006.01)

(52) U.S. Cl.
CPC .......... *F16H 37/022* (2013.01); *F16H 15/42* (2013.01)

(58) Field of Classification Search
CPC .......... F16H 13/04; F16H 13/08; F16H 15/44; F16H 15/506; F16H 37/021; F16H 37/022
See application file for complete search history.

(56) References Cited

U.S. PATENT DOCUMENTS 5,601,509 A    *    2/1997    Munoz .................... F16H 15/54
                                                                 476/53

* cited by examiner

*Primary Examiner* — Jacob S. Scott

(57) ABSTRACT

A mechanical rotary device for continuously variable transmission, the device comprising: a primary rotor adapted to transfer power from a rotary power source to an output shaft; a central rotating member comprising a first set of conical rollers operable by the first set of gears and a second set of conical rollers operatively connected to a second set of gears, mounted in an opposite direction to the first set of conical rollers, axially around the primary rotor. The device further comprises a power transfer ring, adapted to move axially along both sets of conical rollers to transfer power from the first set of conical rollers to the second set of conical rollers, thereby varying the rotation of the output shaft.

8 Claims, 4 Drawing Sheets

DEVICE FOR CONTINUOUSLY VARIABLE TRANSMISSION

FIELD OF THE INVENTION

The present invention generally relates to transmissions, and more particularly relates to a rotary power transmitting device with continuously variable input to output ratio for automotive application.

BACKGROUND OF THE INVENTION

Continuous variable transmission (CVT) is an environmentally friendly automatic type transmission that can be used in different industries including automotive applications. Different types of CVT including friction type, hydrostatic type and ratcheting type CVT were developed to continuously vary the transmission ratio. In vehicles with automatic transmission, CVT enables automatic selection of optimal gear ratio that is needed according to the speed of the vehicle.

In order to provide an infinitely variable transmission, various traction roller transmissions have been developed for transfer of power through traction rollers. In such transmissions, the traction rollers are mounted on support structures which, when pivoted, cause the engagement of traction rollers with the torque discs in circles of varying diameters depending on the desired transmission ratio.

Continuously Variable Transmissions (CVT's) can provide a greater number of potential gear ratios, and in theory can continuously vary the gear ratios within the operating range of a particular CVT design. But CVT's require specially curved surfaces, such as spherical surfaces or torroidal surfaces which are not only expensive to make, but also results in concentrated forces that often lead to premature wear. Existing devices for transmission require a slip start element such as a torque converter or a friction clutch. Furthermore, friction elements are prone to increased stress and comprises a large structural assembly containing a number of components.

Therefore there still exists a need for a compact and efficient rotary power transmitting device for continuously variable transmission with reduced stress on friction elements.

SUMMARY OF THE INVENTION

The present invention relates to a rotary device for continuous variable transmission comprising: a primary rotor adapted to transfer power from a rotary power source to an output shaft; a first set of gears in driving engagement with a central input gear attached to the primary rotor; a central rotating member comprising a first set of conical rollers operable by the first set of gears and a second set of conical rollers operatively connected to a second set of gears, wherein the second set of conical rollers are mounted in an opposite direction to the first set of conical rollers, axially around the primary rotor. The device further comprises a central output gear operable by the second set of gears to rotate the output shaft; and a power transfer ring, adapted to frictionally engage with a parallel outer surface of both sets of conical rollers and movable axially along the central rotating member to transfer power from the first set of conical rollers to the second set of conical rollers, thereby varying the rotation of the output shaft.

DETAILED DESCRIPTION OF THE INVENTION

The following detailed description of the preferred embodiments presents a description of certain specific embodiments to assist in understanding the claims. However, the present invention is intended to cover alternatives, modifications and equivalents, which may be included within the spirit and scope of the invention as defined by the appended claims.

The mechanical rotary device for continuous variable transmission, comprises: a primary rotor adapted to transfer power from a rotary power source to an output shaft; a set of input gears in driving engagement with a central input gear attached to the primary rotor; a central rotating member comprising a set of input conical rollers operable by the set of input gears and a set of output conical rollers operatively connected to a set of output gears, wherein the output conical rollers are mounted in an opposite direction to the input conical rollers, axially around the primary rotor. The device further comprises a central output gear operable by the output gears to rotate the output shaft.

Figure 1:
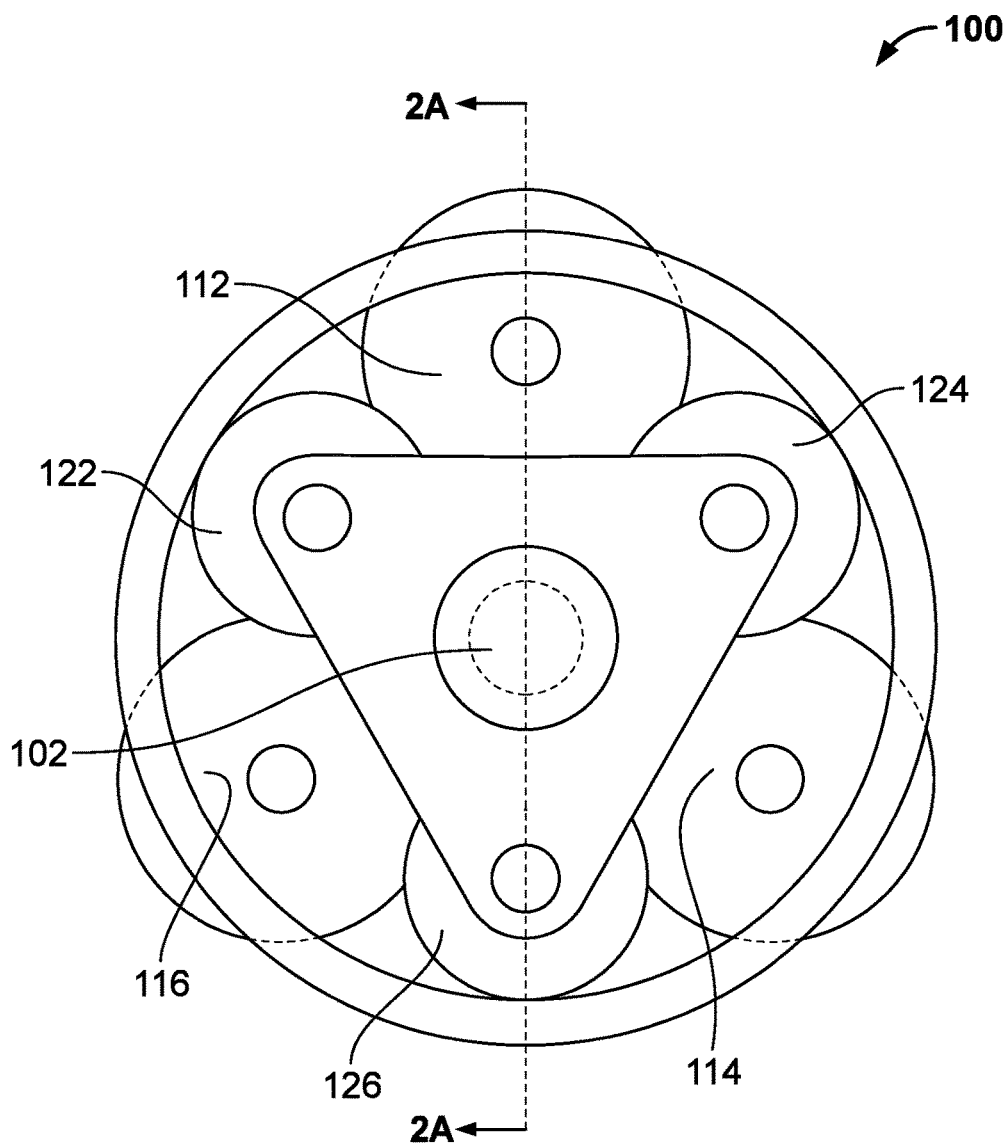
FIG. 1 illustrates a schematic end view of the device for CVT, according to an embodiment of the present invention.

Referring to FIG. 1, which illustrates a schematic end view of the device 100 comprising a set of input conical rollers 112, 114, 116 mounted opposite to a set of output conical rollers 122, 124, 126 around a primary rotor 102. The primary rotor 102 is adapted to transfer power from a suitable source such as a piston/cylinder assembly to an output shaft. The two sets of conical rollers are free to move axially on respective roller shafts but adapted to rotate with their respective roller shafts. The two sets of conical rollers are disposed opposite to each other within the central rotating member around the primary rotor 102 and the roller shaft end of each input and output conical roller is operatively engaged to a planetary input gear and an output gear respectively. In an embodiment, the axis of rotation of primary rotor is opposite in direction to the axis of rotation of the output shaft.

Figure 2A:
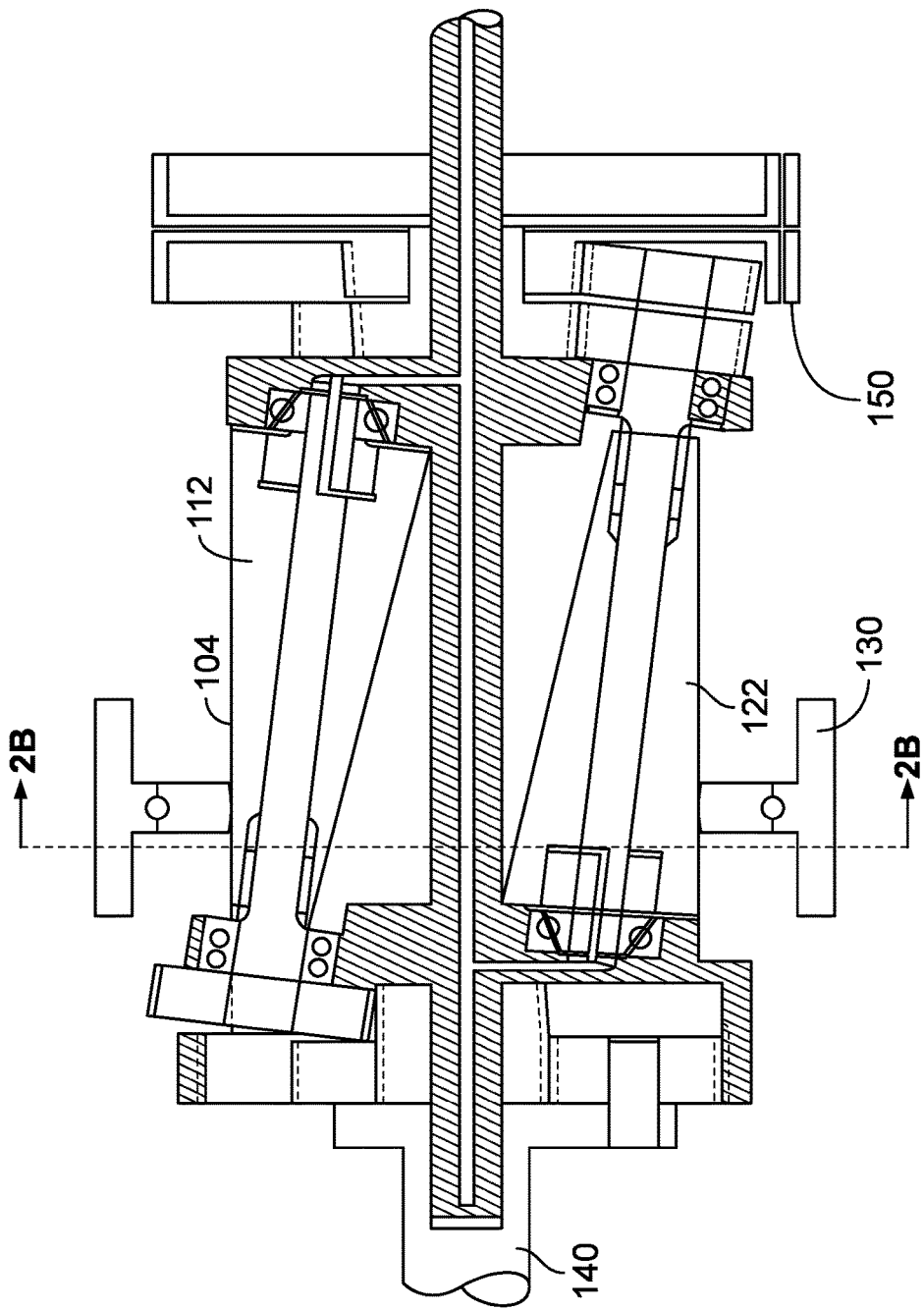
FIG. 2A illustrates a sectional view of the device of FIG. 1

FIG. 2A illustrates a sectional view of the device 100 of FIG. 1. The device 100 comprises a power transfer ring 130, adapted to frictionally engage with a parallel outer surface of both sets of conical rollers and movable axially along the central rotating member 104 to transfer power from one of the input conical roller 112 to one of the output conical roller 122 thereby varying the speed of rotation of the output shaft 140. The device further comprises at least one locking pad 150 acting as a clutch mechanism adapted to engage the central input gear 110 to the transmission or to disengage the central input gear 110 from the transmission. When the transmission is disengaged the set of input gears operatively connected to the input rollers are free to spin and therefore no power is transferred.

Figure 2B:
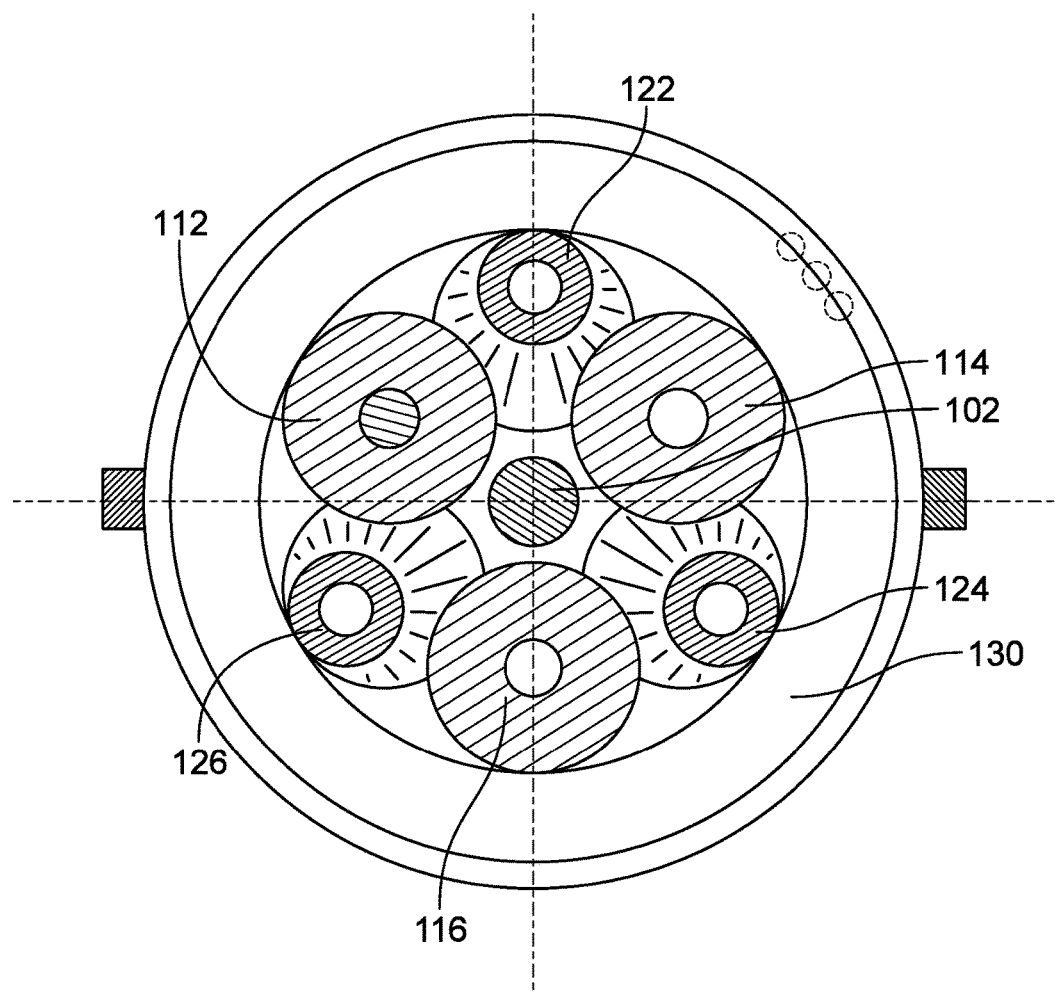
FIG. 2B shows a sectional view of the device of FIG. 2A.

FIG. 2B illustrates a sectional view of the device of FIG. 2A. The device 100 shows the set of input conical rollers 112, 114, 116 nested with the set of output conical rollers 122, 124, 126, circled around the primary rotor 102 within the central rotating member. The power transfer ring 130 adapted to move axially along the parallel outer surface of both sets of conical rollers.

Figure 3:
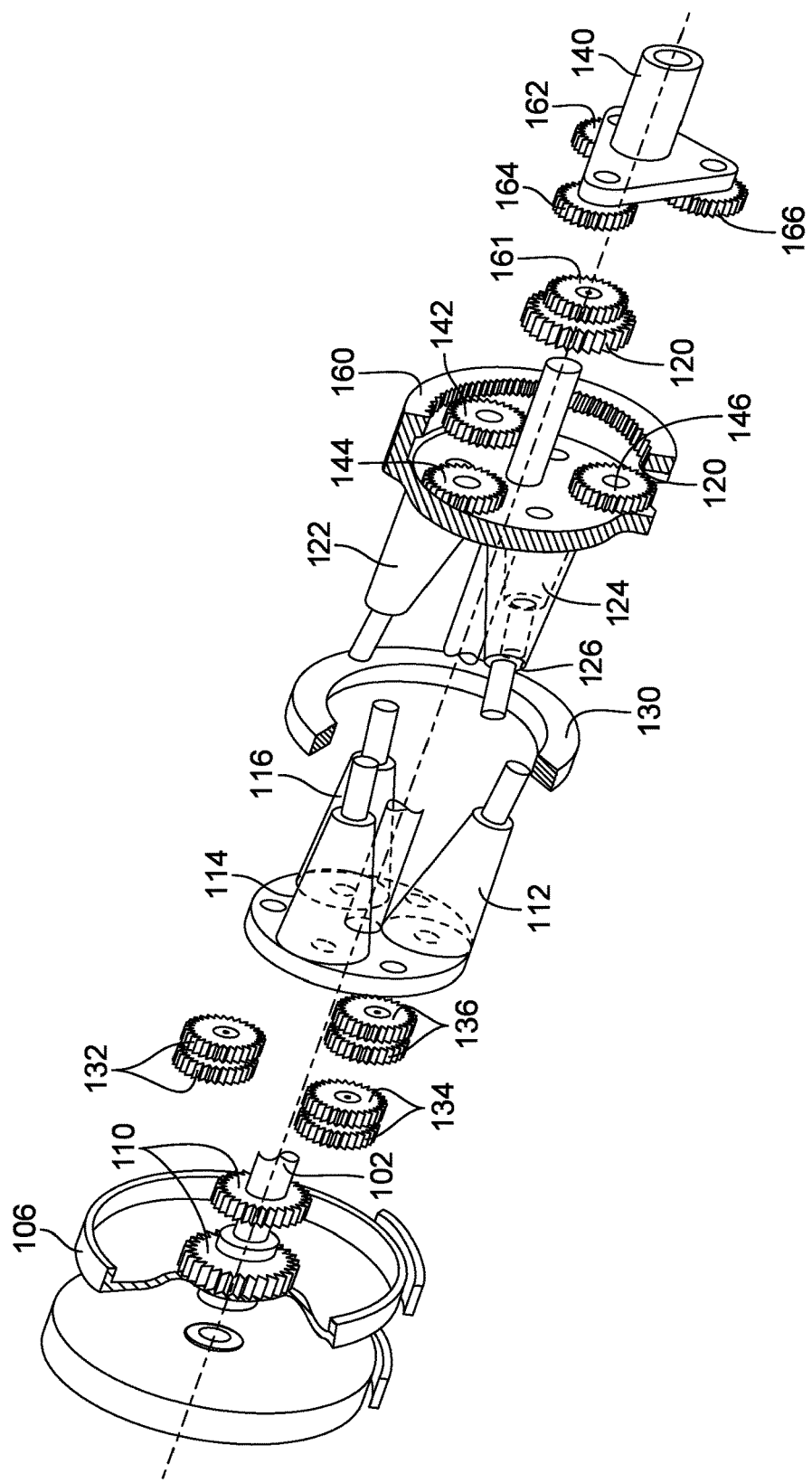
FIG. 3 illustrates an exploded view of the device for CVT, according to an embodiment of the present invention.

FIG. 3 illustrates an exploded view of the device according to an embodiment of the present invention. The device 100 comprises the primary rotor 102 with one end attached to a disc 106 coupled to a power source such as a piston/cylinder assembly. The rotor 102 is operatively engaged with the central input gear 110 which can be engaged or disengaged with the transmission by at least one brake mechanism comprising brake bands 150. The central rotating member 104 comprises a set of three input conical rollers 112-116 mounted around the primary rotor 102 and a set of three output conical rollers 122-126 nested between the input conical rollers, with tapered surfaces of the two sets of conical rollers in opposite directions. For example, the tapered ends of input conical rollers are in opposite direction to the tapered ends of the output conical rollers. The central input gear 110 is in driving engagement with a plurality of planetary input gears 132, 134, 136 adapted to drive the input conical rollers 112-116.

Similarly the output conical rollers 122-126 are fitted with a plurality of planetary output gears 142, 144, 146 together which drives the central output gear 120 in an opposite direction of the output ring gear 160. In an embodiment, the central output gear 120 is in driving engagement with a sun gear 161 of an epicyclic gear train, in turn connected to the output shaft 140 via set of planetary gears 162, 164 and 166. The output motion of the planetary gears 162-166 is the difference between the motion of the output ring gear 160 and the sun gear 161.

In an embodiment, the planetary input gears 132-136 or output gears 142-146 may comprise a set of low range gears coupled to set of high range gears. By moving the power transfer ring 130 axially along the parallel outer surface of conical rollers, the output speed may be adjusted from full forward to zero and to reverse as desired. The device of the present invention allows a continuously variable gear ratio depending on the position of the power transfer ring moving axially along the input and output conical rollers.

In a different embodiment, the total ratio range can be shifted by adding an extra set of planetary input gears adapted to drive the rollers and an alternate engagement band. This can provide a selectable ratio relationship that may be employed to provide an extra economy mode or a higher performance mode. A friction traction force is achieved by loading the conical rollers along the axis of their shafts to push outward against the ring. This can be done either by spring force, helical cam or by hydraulic pressure.

The device for CVT, according to the present invention offers numerous advantages including elimination of slip-start element such as a torque converter or friction clutch. The device doesn't require a separate reverse gear as the direction and speed of rotation is varied by the power transfer ring. The power is only partially transferred through the friction drive thus reducing the stress on friction elements which reduce the stress on any one. The friction drive is operated at higher speed to minimize the torque load. The device design employs a minimum number of components and is extremely compact, approximately 7 inches in diameter by 12 inches long. There is no axial load on the transfer ring, thereby simplifying control. The power transfer ring can be shifted anytime the input shaft is rotating regardless of whether the transmission is engaged or not, thus further simplifying control.

The foregoing description and drawings comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Many modifications and other embodiments of the invention will come to mind to one skilled in the art to which this invention pertains having the benefit of the teachings presented in the foregoing descriptions and the associated drawings. Although specific terms may be employed herein, they are used in a generic and descriptive sense only and not for purposes of limitation. Accordingly, the present invention is not limited to the specific embodiments illustrated herein, but is limited only by the following claims.

The invention claimed is:

1. A rotary device for continuous variable transmission comprising:
   a primary rotor adapted to transfer power from a rotary power source to an output shaft;
   a first set of gears in driving engagement with a central input gear attached to the primary rotor;
   a central rotating member comprising a first set of conical rollers operable by the first set of gears and a second set of conical rollers operatively connected to a second set of gears, wherein the second set of conical rollers are mounted in an opposite direction to the first set of conical rollers, axially around the primary rotor;
   a central output gear operable by the second set of gears to rotate the output shaft; and
   a power transfer ring, adapted to frictionally engage with a parallel outer surface of both sets of conical rollers and movable axially along the central rotating member to transfer power from the first set of conical rollers to the second set of conical rollers, thereby varying the rotation of the output shaft.

2. The device of claim 1, further comprises an epicyclic gear train connecting the central output gear to the output shaft.

3. The device of claim 1, further comprises a clutch mechanism adapted to engage or disengage transmission from a central fixable gear.

4. The device of claim 1, wherein the first set of gears comprises high range gears and low range gears.

5. The device of claim 1, wherein the first set of conical rollers are adapted to rotate in a first direction at a higher speed than the primary rotor.

6. The device of claim 1, wherein the first set of conical rollers are nested between the second set of conical rollers, in such a way that each conical roller outer surface is parallel to every other conical roller within each set.

7. The device of claim 1, wherein the first set of gears comprises a plurality of input gears.

8. The device of claim 1, wherein the second set of gears comprises a plurality of output gears.

* * * * *